(12) United States Patent
Daw et al.

(10) Patent No.: US 9,157,653 B2
(45) Date of Patent: Oct. 13, 2015

(54) APPARATUS AND METHOD FOR INSERTING ANGLE PLATES AND CLOSING DUCT SEAMS

(71) Applicant: HVAC INVENTORS/SYSTEMATION, INC., Providence, RI (US)

(72) Inventors: David E. Daw, Cranston, RI (US); Cody B. Umberger, Oak Ridge, NJ (US); Michael C. Borwig, Swisher, IA (US)

(73) Assignee: HVAC Inventors/Systemation, Inc., Providence, RI (US)

( * ) Notice: Subject to any disclaimer, the term of this patent is extended or adjusted under 35 U.S.C. 154(b) by 0 days.

(21) Appl. No.: 14/678,569

(22) Filed: Apr. 3, 2015

(65) Prior Publication Data

US 2015/0233601 A1    Aug. 20, 2015

Related U.S. Application Data

(62) Division of application No. 14/296,084, filed on Jun. 4, 2014, now Pat. No. 9,027,376.

(60) Provisional application No. 61/956,230, filed on Jun. 4, 2013.

(51) Int. Cl.
| | |
|---|---|
| *F24F 13/02* | (2006.01) |
| *B23P 11/00* | (2006.01) |
| *B21D 53/74* | (2006.01) |
| *B21D 39/02* | (2006.01) |

(52) U.S. Cl.
CPC ............ *F24F 13/0245* (2013.01); *B23P 11/005* (2013.01); *B21D 39/021* (2013.01); *B21D 53/74* (2013.01)

(58) Field of Classification Search
CPC ... F24F 13/0209; F24F 13/0245; B23P 11/00; B23P 11/005; B21D 19/043; B21D 39/021; B21D 39/023; B21D 53/74; Y10T 29/49915
See application file for complete search history.

(56) References Cited

U.S. PATENT DOCUMENTS

| | | | | |
|---|---|---|---|---|
| 4,870,749 | A * | 10/1989 | Roy et al. | 29/798 |
| 5,495,652 | A * | 3/1996 | Kitamura et al. | 29/243.5 |
| 5,621,956 | A * | 4/1997 | Kolesar | 29/243.5 |
| 6,081,985 | A * | 7/2000 | Fischer et al. | 29/509 |
| 8,875,388 | B1 * | 11/2014 | Daw et al. | 29/818 |

* cited by examiner

*Primary Examiner* — Edward Tolan
(74) *Attorney, Agent, or Firm* — Breiner & Breiner, L.L.C.

(57) ABSTRACT

An apparatus and method are described for automatically inserting angle plates into duct work and for seaming the duct work.

19 Claims, 14 Drawing Sheets

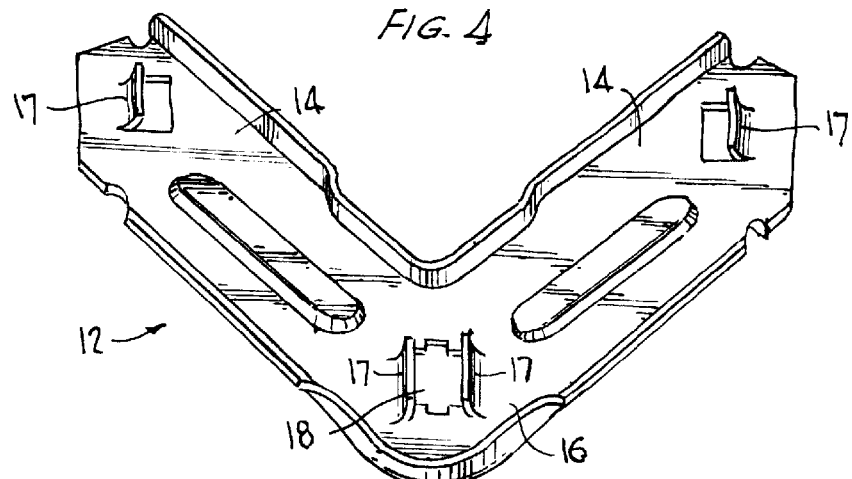
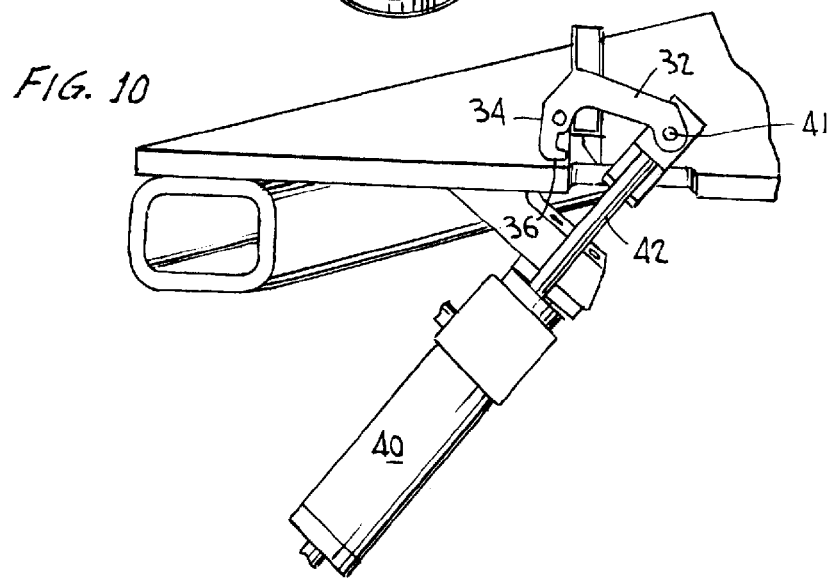
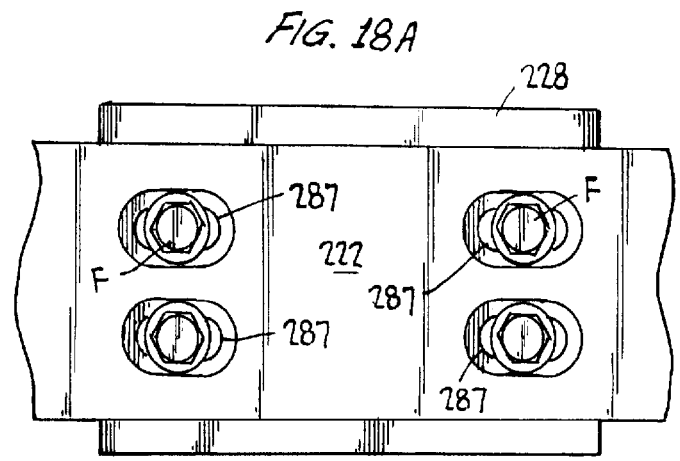

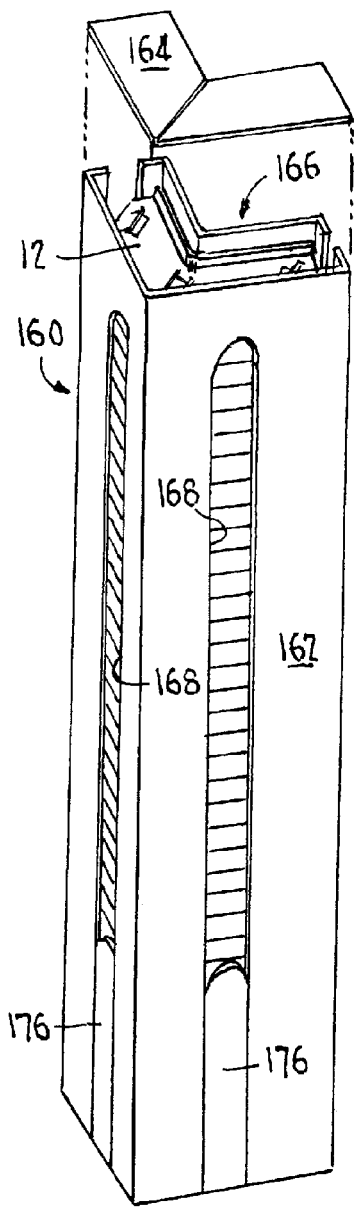
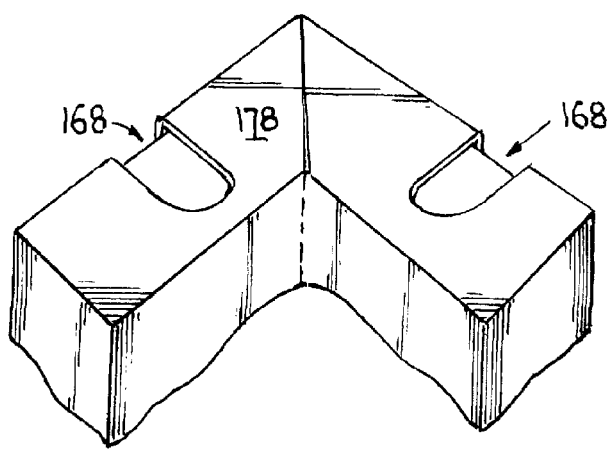
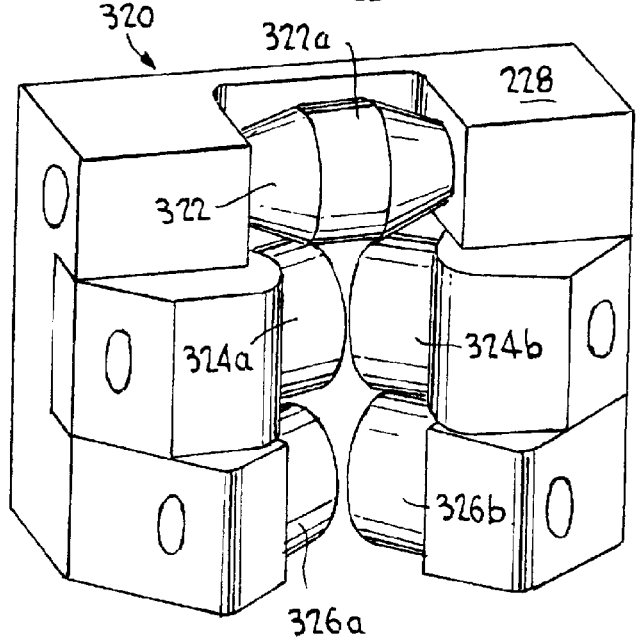

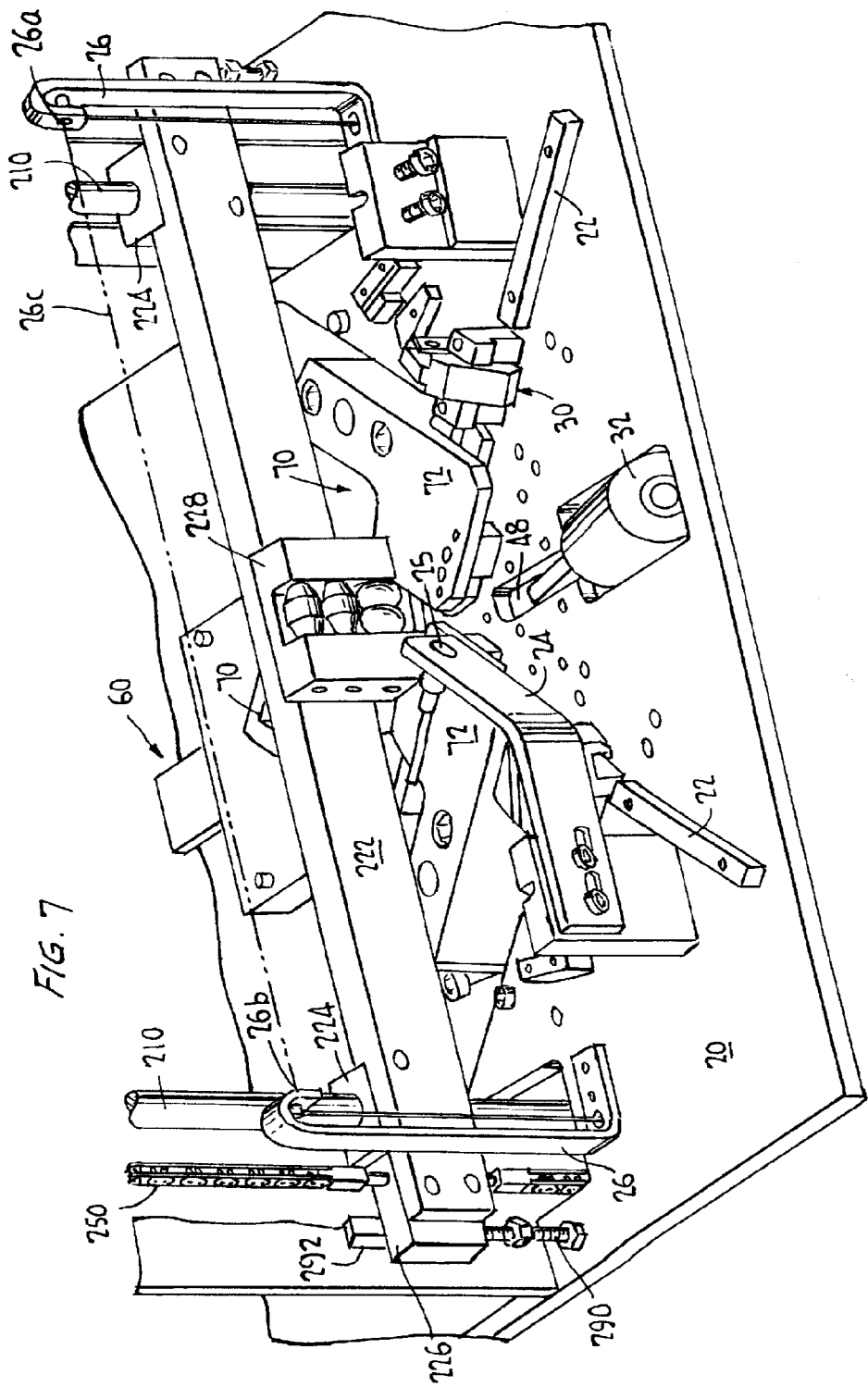

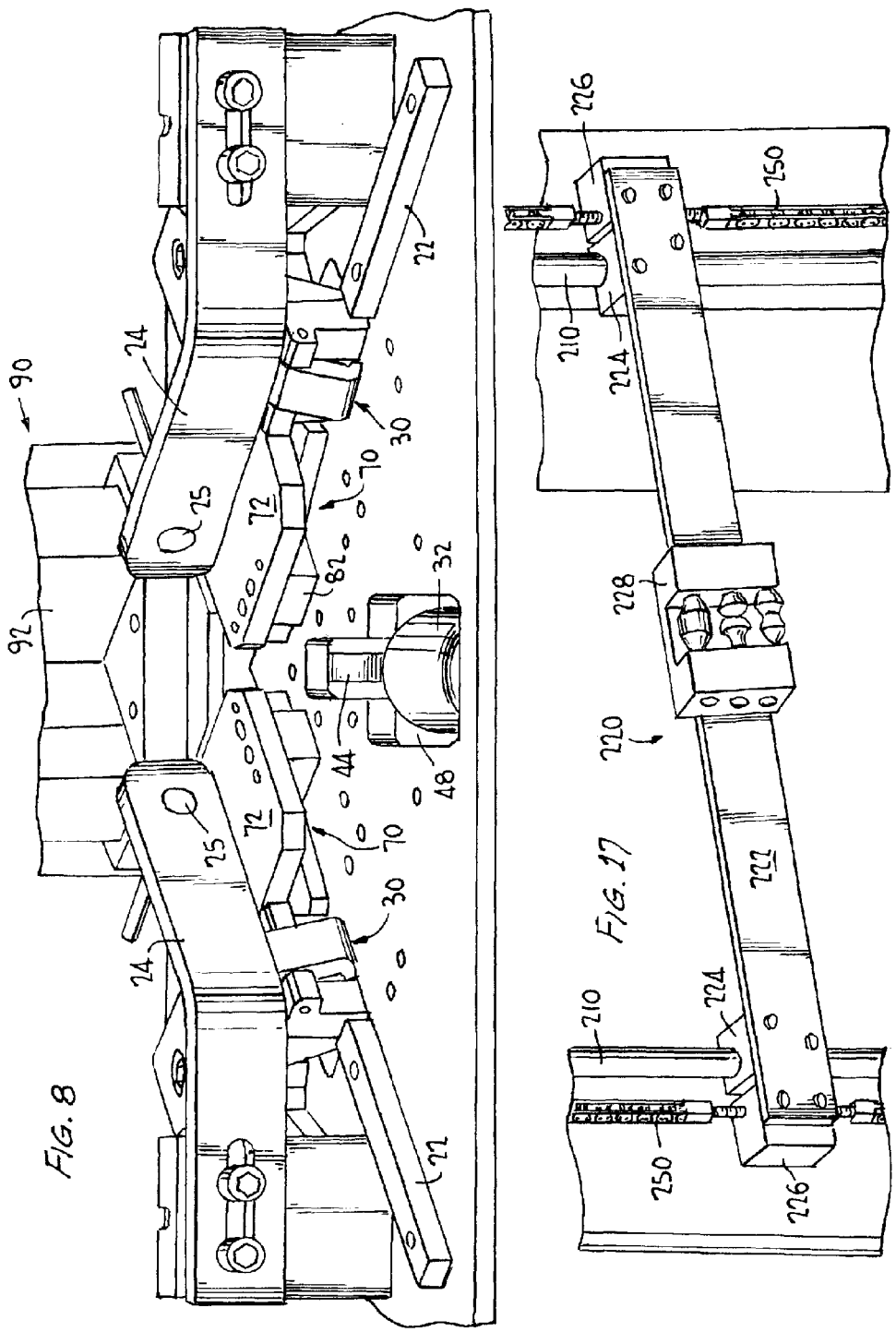

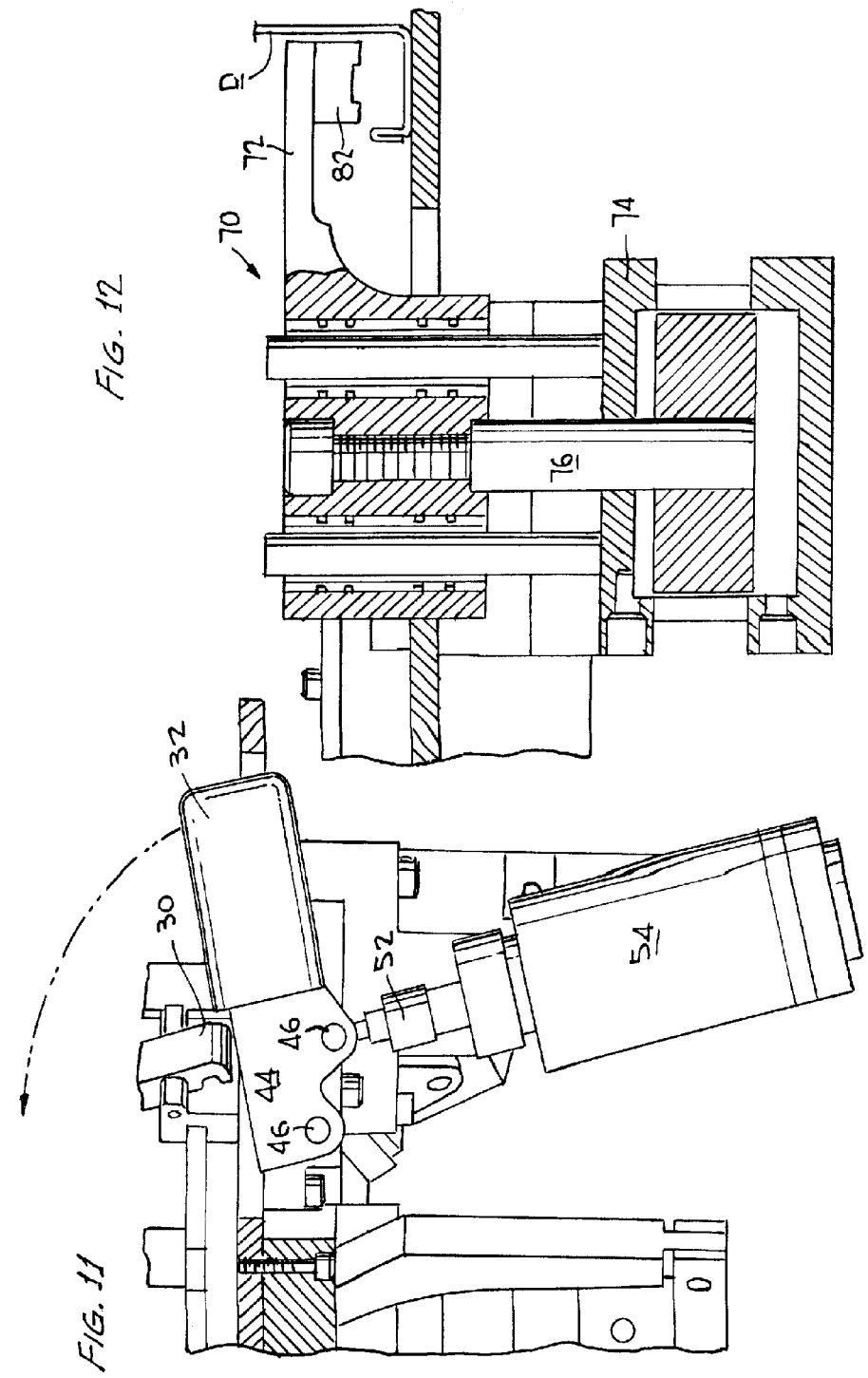

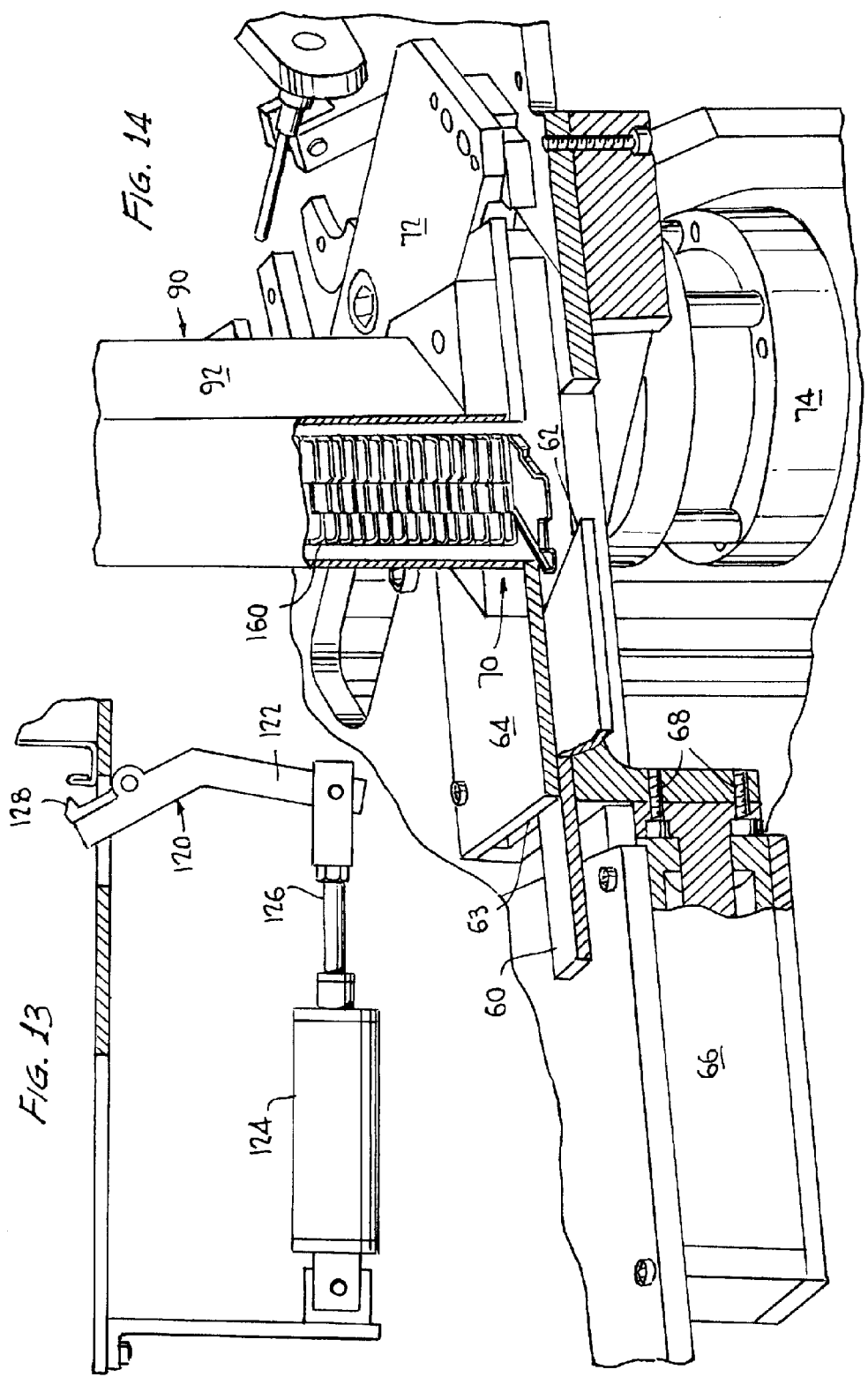

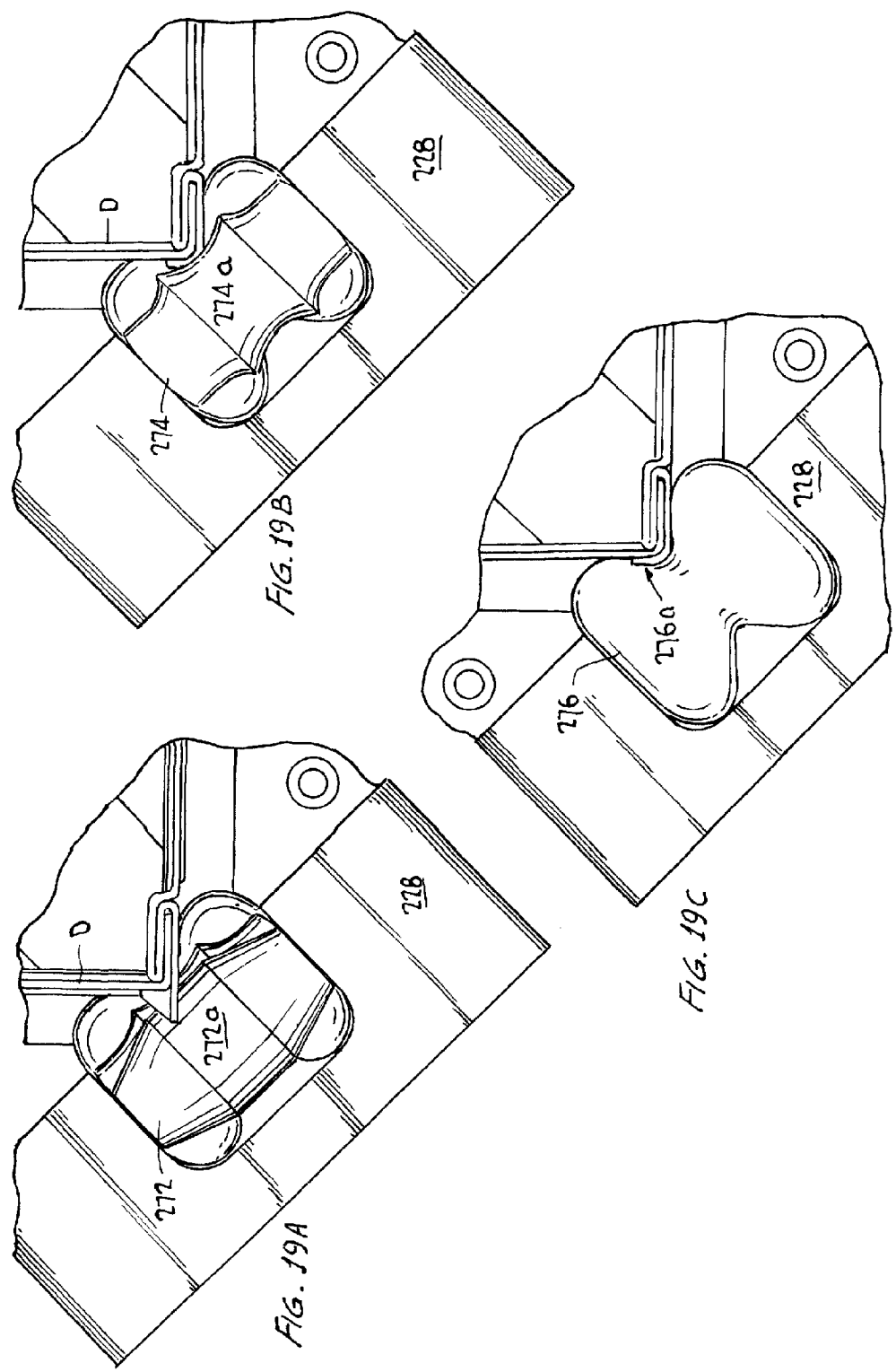

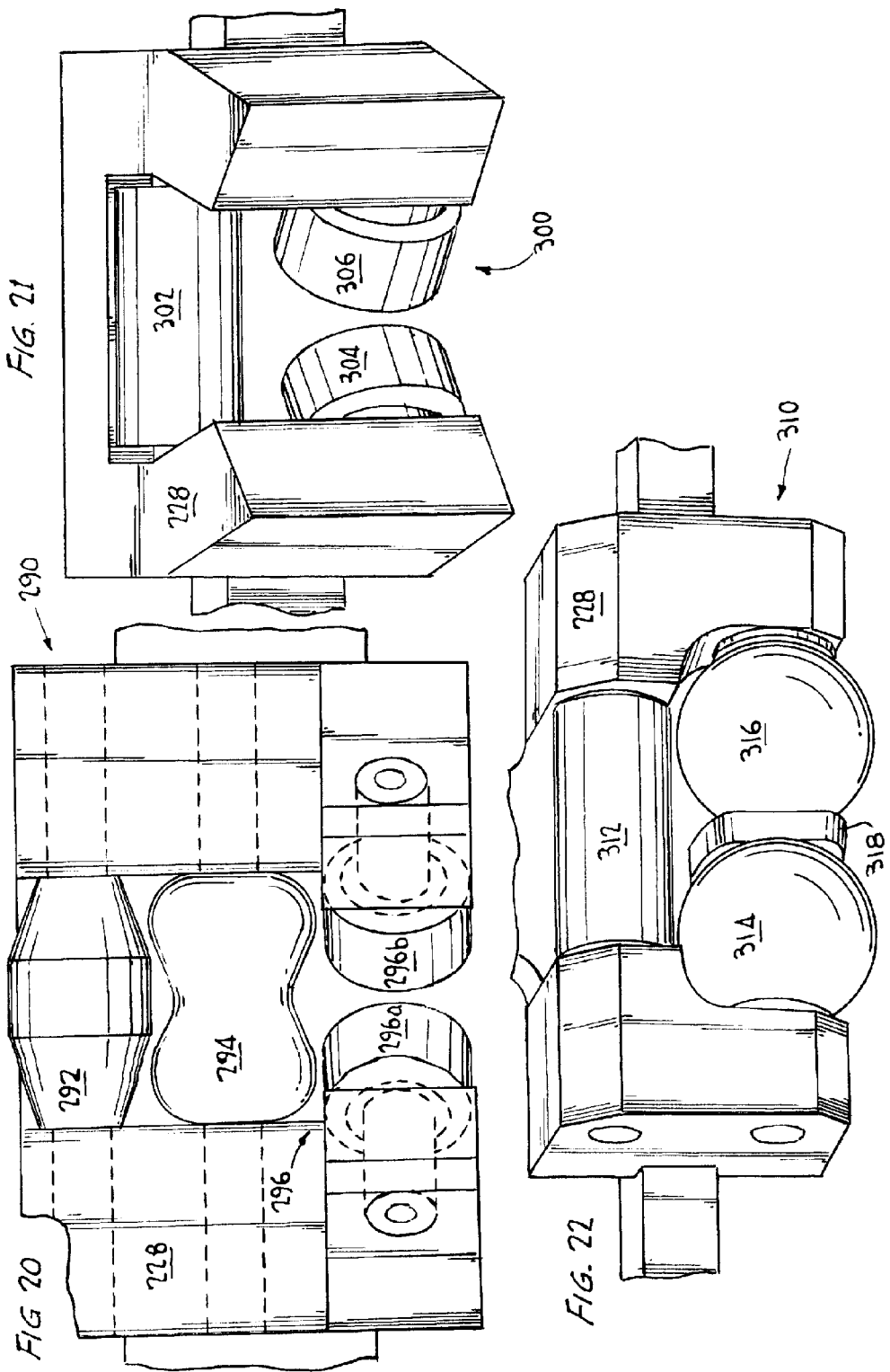

APPARATUS AND METHOD FOR INSERTING ANGLE PLATES AND CLOSING DUCT SEAMS

RELATED APPLICATION

This application claims benefit of and is a division of non-provisional application Ser. No. 14/296,084 filed Jun. 4, 2014, pending, which claims benefit of U.S. Provisional Application Ser. No. 61/956,230, filed Jun. 4, 2013, entitled "Apparatus And Method For Inserting Angle Plates And Closing Duct Seams," which applications are incorporated herein by reference in its entirety.

FIELD OF THE INVENTION

The present invention relates to an apparatus and method for automatically inserting angle plates into duct work and seaming the duct work.

BACKGROUND OF THE INVENTION

Rectangular or box shaped ducts are extensively used in heating and ventilating systems to distribute heated or cooled air throughout the structure. These ducts are commonly formed from different gauges of sheet metal in sections of predetermined length which are then connected to form a continuous duct for distributing air. Each section of duct is formed by bending two pieces of sheet metal of the desired length at a ninety degree angle and with the Pittsburgh type seam one edge of each piece is formed with a longitudinally extending groove to form the female portion of the joint while the other edge is bent over along its length to form the male portion of the joint. The two parts are then assembled by inserting the male portion of each part into the female portion leaving an edge extending beyond the joint from the female portion, which edge must then be bent over to lock the seam. Apparatus are known in which to automatically close the duct seam, including a Pittsburgh seam, including the commercial apparatus sold by the Iowa Precision Industries Division of Mestek Machinery, Inc. ("IPI") under the trademark WHISPER-LOC®. The WHISPER-LOC® machine has been commercially successful in the marketplace for automatically seaming duct work. Such apparatus are also disclosed in IPI's U.S. Pat. No. 5,189,784, issued Mar. 2, 1993, and U.S. Pat. No. 5,243,750, issued Sep. 14, 1993, and Engel Industries, Inc.'s U.S. Pat. No. 5,353,616, issued Oct. 11, 1994, the disclosures of these patents are incorporated in their entirety herein by reference. When seaming duct work using the WHISPER-LOC® machine or the apparatus and methods disclosed in these patents, the duct must be inserted into the machine in a specific orientation to close the seam.

There is also disclosed in the art an apparatus and method for seaming a Pittsburgh seam in a vertical apparatus wherein the seam is said to be completed regardless of the orientation of the male and female portions of the Pittsburgh seam as disclosed in U.S. Patent Application Publication Nos. 2012/0186316, published Jul. 26, 2012, and 2013/0104614, published May 2, 2013, the disclosures of which are incorporated in their entirety herein by reference.

Additionally, apparatus and methods for placement of angle plates in transverse duct flanges are known and disclosed in Systemation, Inc.'s U.S. Pat. Nos. 5,283,944; 5,321,880; and 5,342,100, the disclosures of these patents being incorporated in their entirety herein by reference. Commercial apparatus using the inventions of these patents have been sold under the trademark CORNERMATIC® by IPI. These machines have been commercially successful and have transformed the industry with respect to the insertion of angle plates into duct work. Additionally, U.S. Pat. No. 5,926,937 discloses a mobile apparatus for placement of angle plates in transverse duct flanges, the disclosure therein being incorporated in its entirety herein by reference. This latter patented technology has been manufactured commercially by IPI and sold under the trademark CORNER CADET®.

The CORNERMATIC® and CORNER CADET® apparatus and methods have been commercially successful. They have saved the industry substantial time and money and made the insertion of angle plates into ducts substantially easier for sheet metal fabricators, including saving wear and tear on the human body. However, the CORNERMATIC® and CORNER CADET® machines usually cannot accept irregular shaped duct fittings referred to in the industry and herein as "fittings." As such, workers must manually insert the angle plates into the fittings.

Accordingly, while the CORNERMATIC® and CORNER CADET® machines have been an extremely successful "work-horse" in duct fabricating shops, improvement to these machines and methods are possible, including with respect to fittings. An improved apparatus and method for automatically inserting angle plates into duct flanges has been invented and is disclosed in Systemation's U.S. patent application Ser. Nos. 14/211,733 and 14/211,921, both filed on Mar. 14, 2014, entitled "Apparatus and Method for Placement of Angle Plates in Transverse Duct Flanges," the disclosures of which are incorporated in their entirety herein by reference (collectively referred to as "the '733 Application"). This new apparatus includes novel features and improvements over the CORNERMATIC® and CORNER CADET® machines including, but not limited to, (1) a new apparatus for the automatic insertion of angle plates into duct flanges, including fittings; (2) a new clamp for clamping duct flanges; (3) a new supply hopper located out of the area of operation; (4) a new presser for pressing the angle plates into the duct flanges; (5) a new package for angle plates; and (6) combinations of the above and other features of the apparatus as disclosed in the '733 Application. This new apparatus is now being sold by IPI under the trademark CORNERMATIC® PLUS™. In its short time on the market, the CORNERMATIC® PLUS™ apparatus has received market acceptance.

Additionally, there is disclosed in the '733 Application a new packaging for the angle plates which packages include a plurality of angle plates, including eighty angle plates, which may be inserted directly into the hopper, thereby saving the time and expense associated with the manual insertion of the angle plates in limited numbers. The packaging may include a plurality of angle plates contained in a self-contained cardboard package.

Additionally, Systemation's U.S. Pat. No. 5,283,944 discloses a proposed combination of a seam closer for a Pittsburgh seam and automatically inserting angle plates into a duct section including as referenced at FIG. 19 of the patent. However, this conception has never been reduced to practice and there are no known apparatus for automatically inserting angle plates into the piece of duct and automatically closing the seam of a piece of duct. Accordingly, there is a need in the market for a single machine which will automatically insert angle plates into a piece of duct and will automatically close the seam of the piece of duct. Such apparatus will be substantially beneficial to the industry as, among other things, it will save the expense to contractors of having to have two machines in their shop to automatically insert angle plates and to close a seam; it will save space in a manufacturer's shop by eliminating the need for two machines when one machine will do the same job; it will save contractors time as the single machine will accomplish that of two machines in a shorter period of time and, therefore, also save labor costs; and it will make the manufacture of duct easier and more efficient.

SUMMARY OF THE INVENTION

The present invention comprises an apparatus and a method for automatically inserting angle plates into duct work and automatically closing the seam of the duct work, e.g. a Pittsburgh seam. The apparatus comprises a platen for receiving a duct and an assembly for automatically inserting angle plates into the duct and an assembly for automatically closing the seam of the duct. The assembly for automatically inserting the angle plates into the duct may be substantially the same or similar in part to that disclosed in Systemation's U.S. Pat. No. 5,283,944 or Systemation's U.S. patent application Ser. Nos. 14/211,733 and 14/211,921, both filed Mar. 14, 2014, or combinations thereof, and which disclosures have been incorporated in their entirety herein by reference. The assembly comprises an adjustable dual head, namely a lower head and an upper head, for concurrently inserting angle plates at the lower and upper ends of the duct. The upper head is vertically adjustable to accommodate different sizes of duct. Such assemblies may include a clamp member or clamp members for clamping the duct into position on the platen; a feed member for feeding an angle plate into place in the duct flange; a press member or press members for pressing an angle plate into the flange; an angle plate supply hopper for receiving a plurality of angle plates, preferably in a package, or other assembly for supplying angle plates to the feed member; and crimper members for crimping the duct flange after the angle plate has been inserted into the duct flange.

In a presently preferred embodiment of the invention, the angle plates will first be inserted into the duct work prior to closing the seam of the duct. This is the opposite of what is most often currently done in the industry. Specifically, the current industry practice is to use the WHISPER-LOC® machine to automatically close the Pittsburgh seam and then to use the CORNERMATIC® machine to automatically insert angle plates. It has been found with the apparatus and method of this invention that by inserting the angle plates first, this will straighten and square the duct and allow for an easier closing of the seam in the duct.

The seam closing assembly of the present invention includes a seaming carriage having a horizontal bar and carrier with seam forming members; a pair of linear rails upon which the seam closing carriage moves up and down; a pair of endless chain drives for moving the carriage by, for example, an electric motor; the carrier includes a housing connected to the horizontal bar having seam forming members which may comprise first, second and third rollers, in vertical orientation, connected to the carrier. The first roller will begin the seam closing by bending the edge portion of the female member of the Pittsburgh seam and the second and third rollers will complete the closure by bending the edge member to close the seam. Alternative seam forming members may also be used without departing from the scope of the invention, including as disclosed herein. In the preferred embodiments, the seam closing assembly will close the seam of the duct no matter of the orientation in which the duct is inserted into the apparatus.

Accordingly, the apparatus of the invention may comprise a combination angle plate inserter machine and seam closer machine for automatically inserting angle plates into a duct and closing a seam of a duct. The apparatus may include a dual head assembly having an upper head and a lower head wherein each head includes (1) a platen for receiving a duct; and (2) an assembly for automatically inserting an angle plate into the duct at each end of the duct, including at each of the lower and upper heads at least one clamping member for clamping the duct into position on the platen, a feed member for feeding an angle plate into place in a duct flange, at least one press member for pressing an angle plate into the duct flange, a supply hopper for supplying angle plates to the feed member, and at least one crimper member for crimping the flange of the duct over the angle plate after it has been inserted into the duct flange. The apparatus further includes a seam closing assembly for automatically closing a seam of a duct comprising a pair of vertical support members constructed and arranged outside the work area of the assembly for automatically inserting the angle plate, a seam closing carriage connected to the vertical support members and having a horizontal member with a housing having a seam forming member, and means for moving the seam closing carriage up and down the vertical support members. When a duct is clamped in position, the seam closing assembly will automatically close the duct seam.

These and other objects of the invention will be apparent from the following description of the preferred embodiments of the invention and from the accompanying drawings.

BRIEF DESCRIPTION OF THE DRAWINGS

The following detailed description of the specific non-limiting embodiments of the present invention can be best understood when read in conjunction with the following drawings, where like structures are indicated by like reference numbers.

Referring to the drawings:

FIG. 4 is a perspective view of an angle plate.

FIG. 5 is a perspective view of a package of angle plates.

FIG. 6 is a partial bottom view of the angle plate package of FIG. 5.

FIG. 7 is an enlarged front view of parts of the lower head of the apparatus of FIG. 1.

FIG. 8 is a further enlarged front view of the lower head of the apparatus of FIG. 1.

FIG. 10 is a close up view of a clamping member of the lower head of the apparatus of FIG. 1.

FIG. 11 is a close up view in partial cross-section of another clamping member of the lower head of the apparatus of FIG. 1.

FIG. 12 is a close up side view in partial cross-section showing a press member of the lower head of the apparatus of FIG. 1.

FIG. 13 is a close up view of a crimping member of the lower head of the apparatus of FIG. 1.

FIG. 14 is a close-up view of the angle plate advancing member of the lower head of the apparatus of FIG. 1.

FIG. 17 is a close-up view of the seam closing assembly including the seam closing carriage support, the seam closing carriage drives (in part), the seam closing carriage bar and the housing with the seam closing member.

FIG. 18A is a close up back side view of the carriage and shows connection of the housing to the carriage.

FIGS. 19A-19C are a top view of a piece of duct in the apparatus of FIG. 1 showing the steps of the seam closing of a Pittsburgh seam.

FIG. 20 is a front view of an alternative seam closing member.

FIG. 21 is a front view of another alternative seam closing member.

FIG. 22 is a front view of another alternative seam closing member.

FIG. 23 is a front view of another alternative seam closing member.

DETAILED DESCRIPTION OF THE PREFERRED EMBODIMENTS

Figure 3:
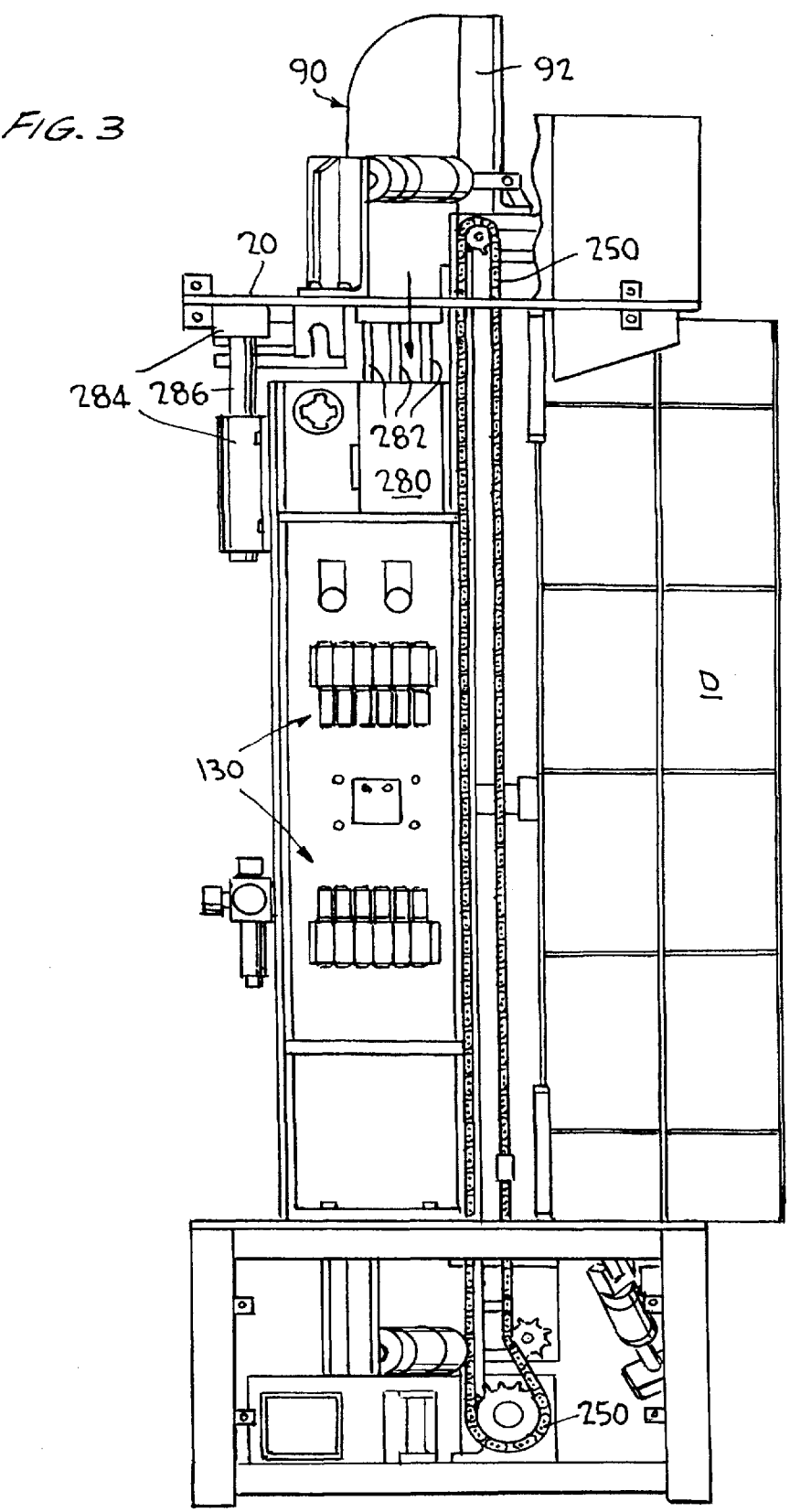
FIG. 3 is a side view of the apparatus of FIG. 1.
Figure 9:
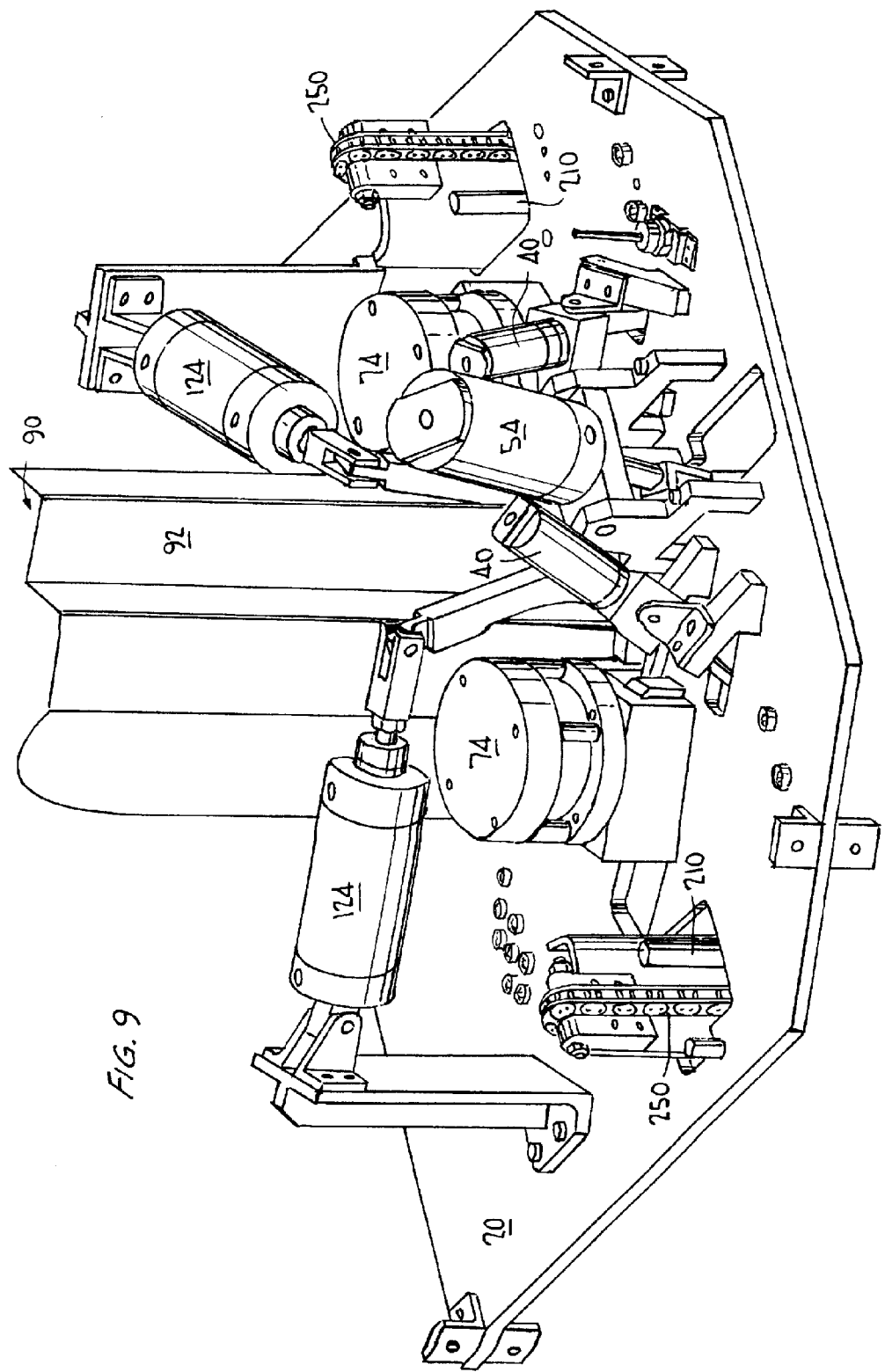
FIG. 9 is a close up top perspective view of the upper head of the invention.

Referring to the Figures, the present invention is directed to a new apparatus and method for automatically inserting angle plates into duct flanges and automatically closing the seam of the duct. The apparatus 10 is a dual head apparatus, the lower and upper heads being substantially similar. For ease of reference, the lower head assembly will be described with the understanding that the upper head is substantially similar, except when otherwise indicated. The apparatus includes a platen 20 for receiving a duct D. The duct D shown in FIGS. 12 and 15 has a duct flange and may be a TDC or TDF duct flange or similar duct flange. Other ducts without flanges may be seamed such as a slip on connector; and slip and drive duct work, such as shown in FIG. 3. The apparatus includes guide posts 22 and guide bars 24 for positioning the duct in position. It is understood that a work table will be placed adjacent to the machine for working with the duct and the angle plate insertion and duct seaming, or the machine may be built into the ground of a fabricator's workshop. The apparatus further includes clamping members 30 and 32 for clamping the duct into position; a feed member 60 for feeding an angle plate into place in the duct flange; press members 70 for pressing an angle plate into the duct flange; and an angle plate support hopper 90 for receiving a plurality of angle plates, e.g. in a package 160, or other angle plate supply assemblies for supplying angle plates to the feed member; and crimper members 120 for crimping the duct flange after the angle plate has been inserted into the duct. These foregoing members are used for automatically inserting angle plates into the duct work and for also holding the duct work in position for automatically seaming the duct. As previously stated, in a preferred apparatus and method, the duct work first has angle plates inserted into a duct flange at each of the top and bottom corners of the duct, i.e. a dual head angle plate inserter apparatus (angle plates are also known as "corners" in the industry). Thereafter, the apparatus and method will close the seam of the duct, e.g. a Pittsburgh seam, although other types of seams may be closed using the apparatus and method of the invention.

The angle plate insertion mechanisms of the apparatus may be generally as disclosed in the commercial CORNERMATIC® machine; Systemation's U.S. Pat. No. 5,283,944; the CORNERMATIC® PLUS™ machine; Systemation's U.S. application Ser. Nos. 14/211,733 and 14/211,921 or combinations of these disclosures, which disclosures have been incorporated in their entirety herein by reference and may not be repeated in detail herein.

The primary components of the apparatus are discussed in greater detail hereafter with reference to the lower head of the apparatus, the upper head being substantially the same, and include a platen 20, clamping members 30 and 32 for clamping the duct in position; a feed member 60 for feeding an angle plate into place in the duct flange; press members 70 for pressing an angle plate into the flange; an angle plate supply hopper 90 for receiving a plurality of angle plates for supplying angle plates to the feed member from, for example, an angle plate package; and crimper members 120 for crimping the duct flange after the angle plate has been inserted into the duct flange. These components of the invention will be discussed in greater detail below.

The platen 20 includes guide posts 22 and guide bars 24 for positioning the duct in place in the machine. Guide posts 22 are fastened adjacent to the platen 20. As stated above, the apparatus may seam both duct work having duct flanges (which require angle plate insertion) such as TDC and TDF duct work or duct work not having duct flanges (which do not require angle plate insertion) such as a slip on connector or slip and drive duct work. With duct work having flanges, the flanges contact the guide posts 22. For duct work with and without flanges, the duct sides contact the guide bars 24. The guide bars 24 include proximity sensors 25 which indicate that a duct is in position and starts the angle plate insertion process as discussed below. Additionally, the apparatus includes light beam bars 26 which include a light beam source 26a and a light beam receiving member 26b for generating light beam 26c to sense when a duct is in place and not seamed as the open ended female edge portion as seen, for example in FIG. 19A, breaks the light beam, e.g. a fiber optic light beam. The machine, therefore, knows that the seam needs to be closed after the angle plate insertion operation. It is understood that other means for detecting the open-ended female edge portion may be used or a manual means for engaging the seam closing assembly may be used.

With respect to the clamp members 30, as shown for example in FIGS. 7, 8 and 10, the clamp member 30 includes a clamp arm 32 for clamping the duct work in place. There are two clamp members 30 which function the same and clamp adjacent flanges of a duct. Clamp arm 32 includes a clamp head 34 and clamp finger 36 which engages the duct flange. Clamp arm 32 is connected to clamp block by a pin upon which the clamp arm 32 pivots. Clamp 30 is attached to an air cylinder 40 by pin member 41. Piston 42 moves the clamp arm 32 from an unclamped to a clamped position. The clamp members 30 are triggered to clamp the duct work in place by proximity sensors 25 as seen, for example, in FIGS. 1, 7 (partial cut away showing only one guide bar) and 8. When the duct sides engage proximity sensors 25, the proximity sensors 25 signal the start of the angle plate insertion process causing air cylinder 40 and piston 42 to move the clamp arms 32 downward and clamp the duct flange into position. During the clamping process, the clamp members 30 pull the flange of the duct outward and will also straighten out any duct flange which has been deformed. This provides for easier receipt of an angle plate into the duct flange. More specifically, the clamp members 30 pull the duct into place and then clamps the duct into position for receiving the angle plate. In doing so, it flattens out the flanges so that there is no interference between the duct flange and the feeding of the angle plate to the duct flange. The clamp members 30 also open up the area of the channel which allows for easier placement of an angle plate into the flange.

Figure 15:
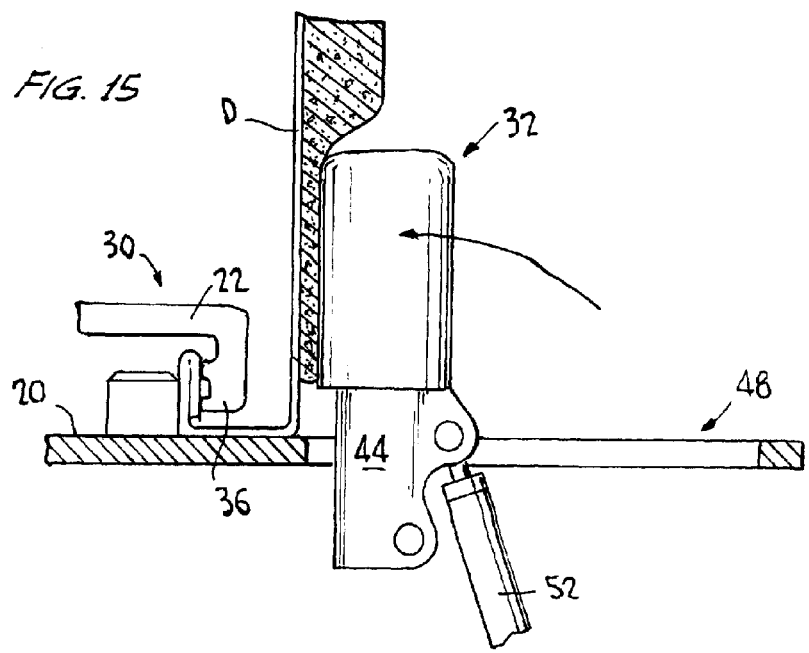
FIG. 15 is a partial view in part in cross-section showing the clamping members positioning a piece of insulated duct work.

Referring, for example, to FIGS. 1, 7, 8 and 11, there is shown a second clamping member 32. This clamping member 32 clamps the duct work into place on the inside of the duct. Clamping member 32, in conjunction with clamping members 30, secures the duct in place. Clamping member 32 is shaped in a cylindrical configuration to avoid tearing insulation or other materials adhered to the inside of the duct. Similarly, other radius configurations may be used. However, it is understood that not all ducts include insulation. The clamping member 32 generally includes a positioning member 44 which is pivotally mounted on a transverse pivot pin 46 mounted below the platen 20 with the platen 20 having an elongated notch 48 therein which permits the positioning member 44 to swing upwardly from the recess position. Below the top surface of the platen as shown in FIG. 11, the positioning member 44 is mounted for movement on the end of a piston rod 52 of a cylinder 54. Referring to FIG. 15, there is a piece of insulated duct D having a TDF flange being clamped into place by clamping members 30 and 32. While the preferred embodiment includes clamping members 30 and 32, it is understood that only clamping members 30 or clamping members 32 may be used to position and hold the duct work in place.

Figure 2:
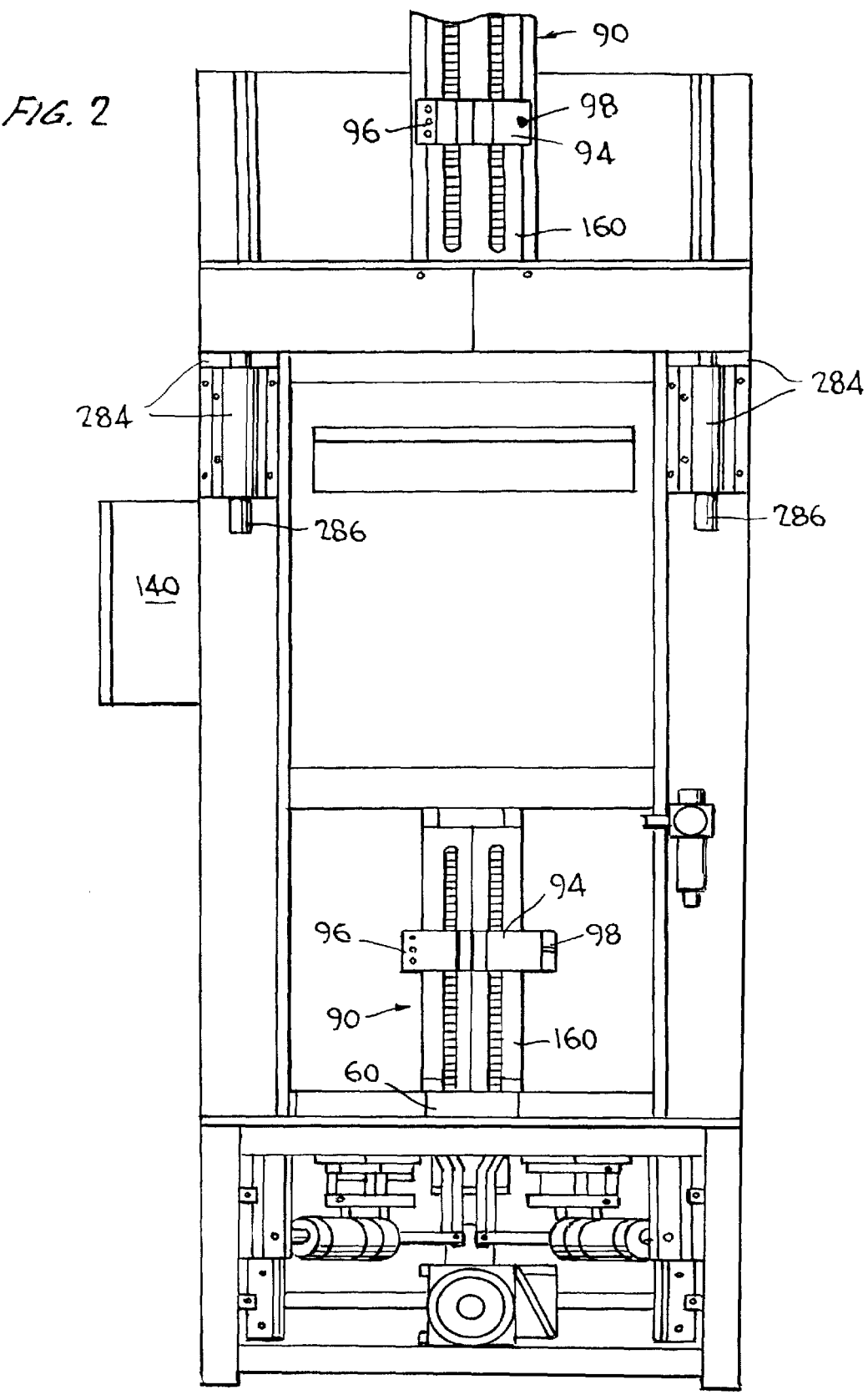
FIG. 2 is a rear view of the apparatus of FIG. 1.

Referring, for example, to FIGS. 2, 7 and 14, the feed member 60 feeds the angle plate into the duct flange. The feed member 60 slides forward and has a V-shaped member 62 which engages an angle plate 12 and moves the angle plate into engagement with the duct flange. The feed member 60 moves along tracks 63 in plate 64. Feed member 60 as shown in the Figures is operated by an air cylinder 66 having piston rods 68 connected to feed plate 60. The operating stroke of the piston rods 68 and feed plate 60 push an angle plate from the bottom of the stack of angle plates in, for example, an angle plate package 160 (shown cut-away in FIG. 14) under plate 64 to engage an adjacent corner of a duct and overlying the two adjacent duct channel flanges.

The angle plate 12 useful in the invention and in the packaging discussed hereafter is as disclosed in, for example, U.S. Pat. No. 5,342,100, and sold commercially by IPI and Ductmate Industries, Inc. under the trademark CORNERMATIC® and shown in FIG. 4. The angle plate 12 includes legs 14, corner 16, projections 17 and bolt hole 18.

Referring to FIGS. 5 and 6, there is illustrated a package 160 for angle plates 12 for insertion in hopper 90 in both the lower and upper heads of the apparatus. In a preferred embodiment, the package 160 is preloaded with angle plates and is disposable. The package includes a cardboard sleeve 162 holding a plurality of angle plates 12 in place, and preferably in the range of 50 to 100 angle plates and more preferably in the range of 70 to 90 angles and most preferably 80 angle plates. The package 160 is useful in the full line of machines sold by Mestek under the CORNERMATIC® trademark and, therefore, depending on the machine, portions of the top and bottom of the package are designed to be removed depending upon the machine in which the package is used. For example, the top of the cardboard sleeve will include a removable portion 164 for creating an opening 166 exposing angle plates 12 for use in the upper head of the present invention or in the CORNERMATIC® PLUS™ machine. Referring to FIG. 6, there is shown the bottom of package 160 having openings 168 and which extend up the two side walls as shown in FIG. 5. For use in the lower head of the apparatus of this invention, pull tabs 176 and bottom portion 178 are removed from the packaging and inserted in hopper 90. When used in the upper head of the apparatus of the invention, the opposite end 164 of package 160 is removed for inserting package 160 into the hopper.

Figure 1:
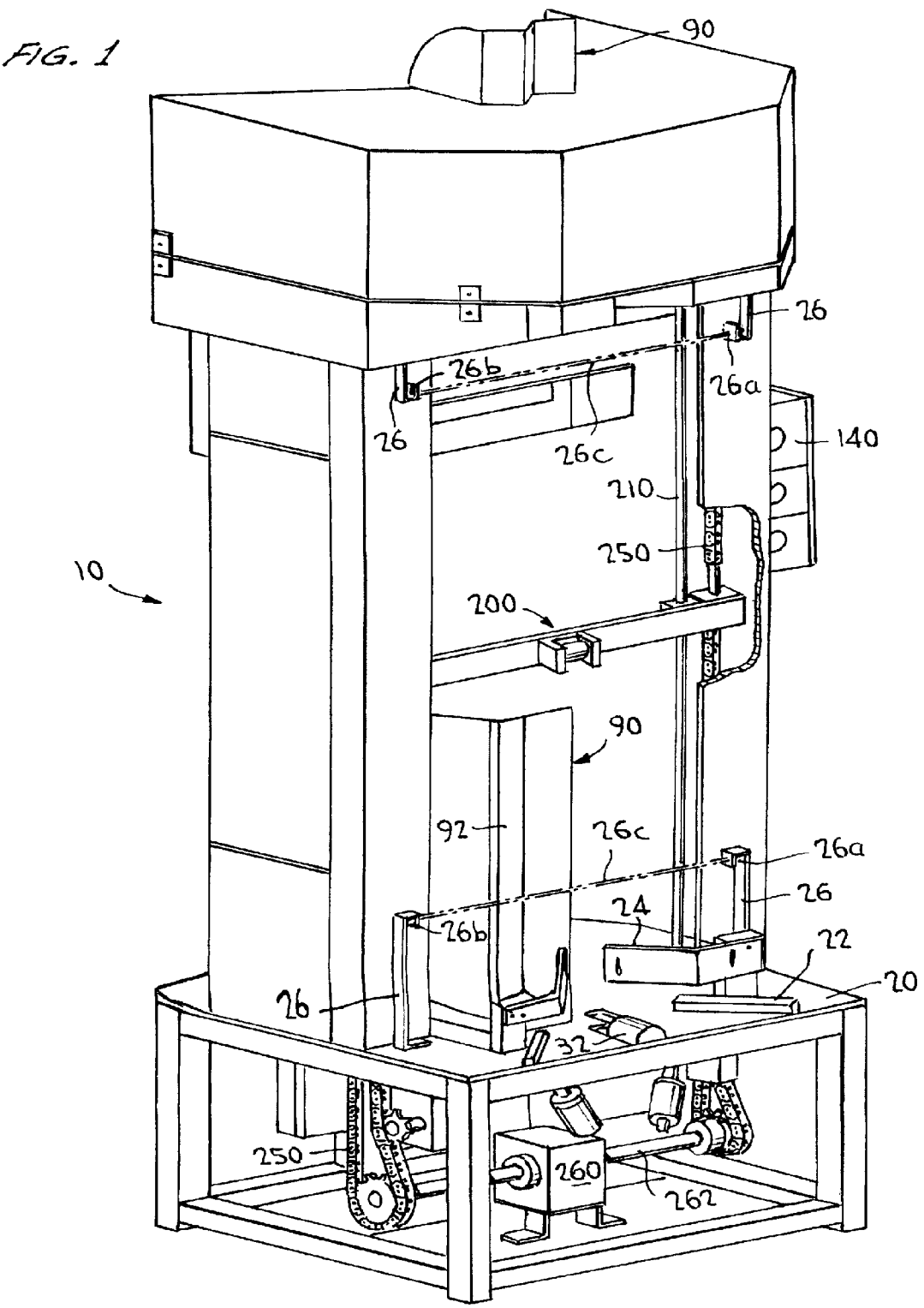
FIG. 1 is a front perspective view of the apparatus of the invention in part without the protective coverings and showing some, but not all, of the parts of the apparatus.

In a preferred embodiment, the angle plates 12 are carried in package 160. As partially shown in FIG. 7, the package 160 is inserted into a V-shaped opening 70 corresponding to the shape of the package. Referring to FIGS. 1, 2 and 14, machine 10 has a hopper 90 having V-shaped housing member 92 for receiving package 160 and which is held in place by gate 94. Gate 94 is opened and closed on a hinge 96. Latch 98 maintains the gate 94 closed. Therefore, a plurality of angle plates, in a preferred embodiment 80 angle plates, may be easily loaded into the upper and lower heads of the apparatus.

Referring, for example, to FIGS. 7, 8 and 12, the apparatus includes press members 70 adjacent to each side of the duct work. The pressers 70 will press the angle plate down into position in the duct flange. Preferably, the pressers 70 will press the angle plate axially. Referring to FIG. 12, there is shown a partial cross-section of an air cylinder of the press member 70 showing a press head 72 connected to an air cylinder 74 having a piston rod 76 for moving the press head 72 for pressing an angle plate. The press head includes a press wedge 82 for contacting the angle plate and pressing the angle plate into the flange.

Referring, for example, to FIG. 13, the apparatus includes crimper members 120 for crimping the duct flange to hold the angle plate in the flange. The crimper mechanism is generally as disclosed in U.S. Pat. No. 5,283,944. The crimper members 120 extend upwardly through an opening in the platen 20. Each crimping member is carried by an angle lever 122 which is pivotally mounted on a pivot pin. The angle lever is connected to an air cylinder 124 having a piston rod 126 for movement of the angle lever. The crimper member 120 includes crimper arm 128 for engaging and crimping the duct flange.

As stated above, the above description has generally referenced the angle plate inserter components in relation to the lower head assembly. The components are substantially similar for the upper head and will not be repeated in detail herein. The upper head is shown, for example, in FIGS. 1, 2, 3 and 9.

Referring to FIG. 3, there is generally shown the pneumatic control panel 130. This panel includes air regulators and a pneumatic manifold with control valves for operating the air cylinders for the upper and lower heads of the apparatus. Each valve has a manual override which can be used for setup and maintenance. The control panel includes incoming air supply regulators; incoming air supply regulator gauges; valves for the clamping members 30; valves for clamping members 32; valves for the feed members 60; valves for the presser members 70; and valves for the crimping members 120. Each valve has a manual override valve. It is understood that the apparatus may also be operated by electrical controls or other means known to those skilled in the art.

FIG. 3 also shows platen 20 which is adjustable to accommodate different size duct. Platen 20 adjusts by air piston 280 and piston rods 282 and includes a support member 284 at the rear of the machine through which rod 286 moves up and down.

The operating sequence of the machine, as discussed hereafter, is controlled by a programmable logic control (PLC) which may be located in an electrical enclosure 140 on the machine. The machine may operate with a standard 220 VAC outlet circuit. When the machine is plugged into a power source, power may be applied to the system and the PLC by pressing on a power on push-button switch. Power may be removed by pressing a power off push-button switch. The machine operation may be controlled by a series of inputs within the PLC. As discussed below, the sequence is activated by the proximity sensors 25 that connect to inputs of the PLC. Once these inputs are activated, the sequence of the corner insertion begins and steps through to completion as discussed hereafter. When duct work without flanges are to be seamed, the control panel includes a separate control for operation of the seam closing assembly.

In the angle plate insertion operation, the duct fitting will be placed on the platen 20 of the apparatus and pushed against guide posts 22 and guide bars 24 where it will engage proximity sensors 25. This causes the clamp members 30 and 32 to clamp the duct work into place. During the clamping stage, the clamps 30 will pull the flange of the duct outward and straighten out the flange for easier receipt of the angle plate. The clamp will also pull the duct in place and then flatten the flanges so that there is no interference of the duct during the angle plate feed cycle. This also widens out the flange and allows for easier integration of the angle plate into the flange. Clamp 32 pivots upward and further positions the duct. Once the duct fitting is clamped in place, feed members 60 moves an angle plate into place in the duct flange. Once the angle plate is in place, press members 70 will axially press the angle plate down into position in the duct flange. Once the angle plate is pressed into place, crimpers 120 will cause crimping arms 128 to crimp the flange over the angle plate to hold the angle plate in the flange. An angle plate is inserted in the lower and upper ends of the duct. The duct may require anywhere from one to four seams. The assembly for seaming will engage when the light beam 26c senses that there is a non-seamed corner of the duct in position for seaming.

Figure 16:
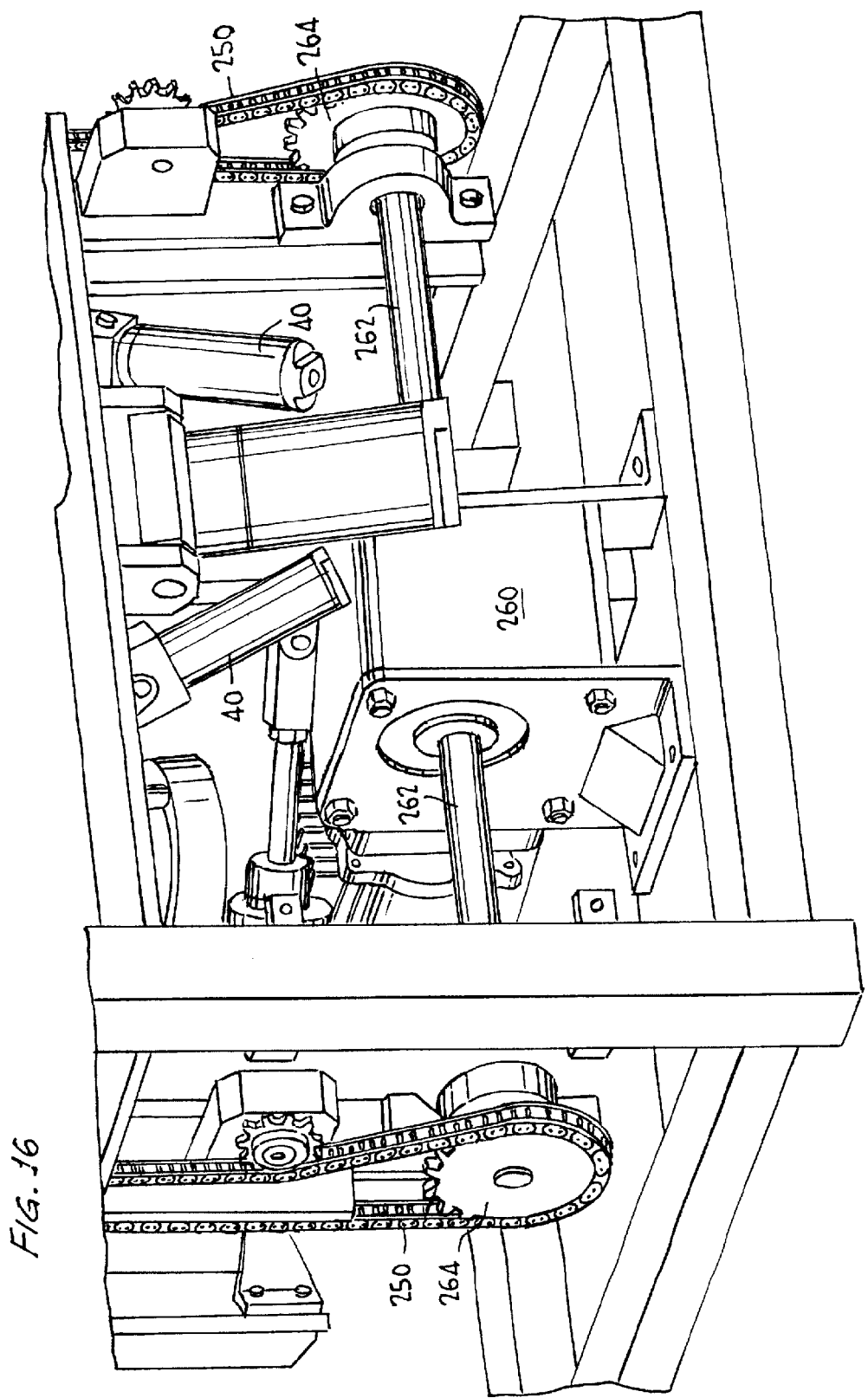
FIG. 16 is a close-up view of a part of the drive assembly for the seam closing assembly of the apparatus of FIG. 1.

The apparatus 10 further includes a seam closing assembly 200 comprising seam closing support members 210 which provide support for a seam closing carriage 220. The seam closing support members 210 may be linear rails. The support members are attached to the frame of the apparatus by suitable fasteners such as bolts (not shown). The seam closing carriage 220 includes a horizontal bar 222. Bar 222 includes guide members 224 which ride on support members 210 and chain members 226 for connecting chain drives at the ends of the bar 222. Bar 222 includes a seam closing carrier including a housing 228 having a seam forming member. The seam closing carriage 220 moves vertically on linear rails 210. The seam closing carriage moves by endless chain drives 250. Referring, for example, to FIG. 16, the chain drives 250 are moved by an electric motor 260 having a drive shaft 262 and drive sprockets 264 engaging each chain drive 250.

As seen in FIG. 3 and discussed above, the apparatus 10 includes an adjustable upper head which will move up and down by piston member 280 and include supports 284 at each side of the rear of the machine for vertical movement of rods 286. For example, a slip on connector or slip and drive duct work is generally longer than flanged ducts and the upper head must be raised to accommodate this type of duct work.

The assembly further includes at the lower and upper heads bolts 290 to mechanically stop the carriage and electrical switch 292 which the carriage will contact to electrically stop the carriage. Bolts 290 are attached to the platens 20.

Figure 18:
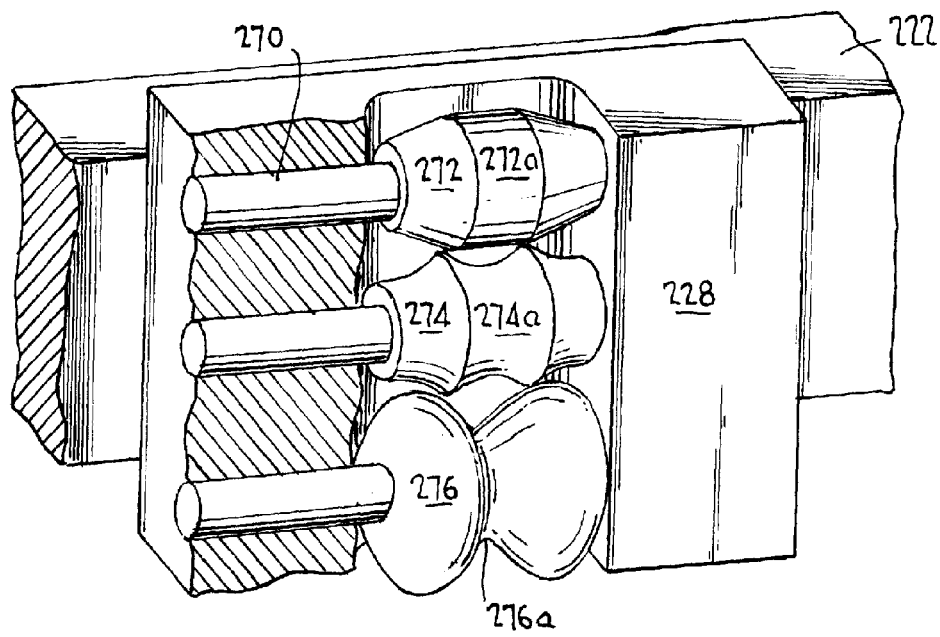
FIG. 18 is a close-up view of the housing and seam closing member of FIG. 17.

A housing 228 is connected to the horizontal bar 222 as shown, for example, in FIGS. 17 and 18. The housing 228 preferably has some play to allow slight horizontal movement, e.g. about an eighth to one-quarter inch, in the event the open duct seam is not completely square and/or centered in the machine. Referring to FIG. 18A, the housing 228 moves on the carrier 222 by using four slotted holes 287 through which fasteners F extend to connect housing 228 to bar 222.

Referring to FIG. 18, the rollers are attached to the housing 228 by pins 270 and will rotate. The housing 228 includes seam forming members which include a first roller 272 having a straight surface 272a; a second roller 274 having about a 120 to 145 degree V-shape 274a, 135 degrees is shown and preferred; and a third roller 276 having about an 85 to 90 degree V-shape 276a, 88 degrees is shown and preferred. These seam forming members will form or close the seam of the duct as discussed below. The duct may be placed in the apparatus in any orientation and the seaming assembly will close the duct seam.

In operation, after the corners are inserted into the flanges of the duct (assuming a duct having flanges), the clamping members will hold the duct into position. When an unseamed duct corner is sensed by light beam 26c, the seaming operation takes place. The carriage will start the seaming operation from the bottom of the machine and move up along linear rails 210 by chain drive members 250. The seam forming members 272, 274 and 276, will close the Pittsburgh seam as shown in FIGS. 19A-C. As seen in FIG. 19A, roller 272 will first engage the edge of the female seam member and bend the seam approximately forty-five degrees. Thereafter, the second roller 274 will further bend the edge of the female seam member as seen in FIG. 19B (a partial cut-away not showing roller 272). Thereafter, roller 276 will further bend the edge of the female seam member ninety degrees to complete the closing of the seam as seen in FIG. 19C (a partial cut-away not showing rollers 272 and 274). The carriage will then move back down to provide a smooth and clean finish to the duct seam.

Referring to FIG. 20, there is shown an alternative seam forming member 290 having roller formers 292, 294 and 296. These seam forming members are similar to that of FIG. 18 except that the third roll forming member 296 is substituted with two roll forming members 296a and 296b. This seam forming member closes the seam similar to that shown in FIG. 18.

Referring to FIG. 21, there is shown an alternative seam forming member 300. This seam forming member includes a cylindrical roller 302 and two roll-forming members 304 and 306 connected to the housing 228. In operation, roller 302 first bends the female edge 45 degrees. Rollers 304 and 306 complete the seam closing bending the female edge 90 degrees.

Referring to FIG. 22, there is shown an alternative seam forming member 310. This seam forming member includes a cylindrical roller 312 and spherical balls 314 and 316 connected to the carrier 222 by a pin (not shown) and separated by a plate 318. This seam forming member closes the seam similar to that shown in FIG. 21.

Referring to FIG. 23, there is shown an alternative seam forming member 320. The seam forming member includes a cylindrical roller 322 having a flat portion 322a; a pair of cam followers 324a and 324b having a combined angle of about 120 to 145 degrees, 135 degrees is shown and preferred; and pair of cam followers 326a and 326b having a combined angle of about 85 to 90 degrees, 88 degrees is shown and preferred. This seam forming member closes the seam similar to that shown in FIG. 18.

It is understood that other seam forming members may be used without departing from the scope of the invention.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

It is claimed:

1. A method for automatically inserting angle plates into a duct flange and for automatically closing a seam of a duct comprising
   (a) inserting a duct having transverse flanges into an apparatus adapted to automatically insert angle plates into said duct flanges and to automatically close a seam of said duct;
   (b) said apparatus including a dual head assembly having a lower head and an upper head wherein each head includes a platen for receiving a duct and an assembly for automatically inserting an angle plate into a duct flange, said assembly for automatically inserting an angle plate into a duct flange including at least one clamping member for clamping the duct into position on the platen, a feed member for feeding an angle plate into place in the duct flange, at least one press member for pressing an angle plate into the duct flange, and a supply hopper having a plurality of angle plates for supplying angle plates to the feed member
   (c) said apparatus further including a seam closing assembly for automatically closing a seam of a duct comprising a pair of vertical support members constructed and arranged outside of the work area of the assembly for automatically inserting an angle plate, a seam closing carriage connected to the vertical support members and having a horizontal member with a housing having a seam forming member, and means for moving the seam closing carriage up and down the vertical support members;
   (d) clamping said duct into said apparatus;
   (e) inserting angle plates into said duct flanges; and
   (f) closing the seam of said duct, wherein said carriage assembly moves vertically on said vertical support members and wherein said seam forming member closes the seam of said duct.

2. The method according to claim 1 wherein said dual head assembly further comprises at least one crimper member for crimping the flange of the duct over the angle plate after the angle plate has been inserted into the duct flange.

3. The method according to claim 1 wherein the apparatus is adapted to first insert angle plates in the duct flange and then close an open seam of the duct.

4. The method according to claim 1 wherein the lower head and the upper head each include a pair of light bars to sense the presence of an unreamed duct corner and a first of said light bars includes a light source and a second of said light bars includes a means for detecting the light source.

5. The method according to claim 1 wherein said seam forming member comprises a plurality of roll forming members and adapted to close the duct seam no matter of the orientation of the duct.

6. The method according to claim 5 wherein said plurality of roll forming members comprises three roll forming members in vertical relation, the upper-most roll forming member having a flat area, the center roll forming member having about an 85 to 90 degree V-shape member; and the lower-most roll forming member having about a 120 to 145 degree V-shape.

7. The method according to claim 5 wherein said plurality of roll forming members comprises two roll forming members in vertical relation, the upper-most roll forming member having a flat area and adapted to begin the seam closing, and the lower-most roll forming member adapted to complete the seam closing and selected from the group consisting of two adjacent roll forming members and two adjacent spherical balls.

8. The method according to claim 5 wherein said plurality of roll forming members comprises three roll forming members in vertical relation, the upper-most roll forming member having a flat area; the center roll forming member comprising two adjacent cam followers having a combined angle of about 120 to 145 degrees, and a lower-most roll forming member comprising two adjacent cam followers having a combined angle of about 85 to 90 degrees.

9. The method according to claim 1 wherein said platen includes guide posts and guide bars for positioning said duct; said guide bars include proximity sensors adapted to sense the position of the duct and to begin the sequence of the angle plate insertion; said at least one clamping member comprises a pair of clamping members adapted to clamp the duct flange and a clamp which pivots from the underside of the platen to engage the inside of the duct to hold the duct in place.

10. The method according to claim 1 wherein said seam closing carriage is adapted to close said duct seam by moving vertically upward on said vertical support members and said seam closing carriage thereafter moves vertically downward to further finish the seam closing and return the seam closing carriage to its starting position.

11. The method according to claim 1 wherein said at least one clamping member comprises a pair of clamping members adapted to clamp the duct flange, said clamping members comprising a clamp arm, a clamp head and a clamp finger adapted to engage said duct flange to lock said flange in place.

12. The method according to claim 11 wherein said clamping members during locking of the duct are adapted to pull the flange outward and straighten out any duct flange having a deformation.

13. The method according to claim 1 wherein said at least one clamping member comprises a clamp which pivots from the underside of the platen to engage the inside of the duct to hold the duct in place.

14. The method according to claim 13 wherein said clamping member is cylindrical in shape.

15. The method according to claim 11 further comprising a clamping member adapted to pivot from the underside of the platen to engage the inside of the duct to hold the duct in place.

16. The method according to claim 1 wherein said upper head is adjustable and said apparatus is adapted to receive different lengths of duct.

17. The method according to claim 1 wherein said at least one presser comprises two pressers adapted to axially press said angle plate into said duct flange.

18. The method according to claim 1 wherein said supply hopper comprises a V-shaped member and having a gate adapted to lock into place a package of angle plates and a package having a plurality of angle plates, wherein said package comprises a sleeve having at least one closure member at an end thereof.

19. A method for automatically closing a seam of a duct comprising
   (a) inserting a duct into an apparatus adapted to automatically insert angle plates into duct flanges and to automatically close a seam of said duct;
   (b) said apparatus including a dual head assembly having a lower head and an upper head wherein each head includes a platen for receiving a duct and an assembly for automatically inserting an angle plate into a duct flange, said assembly for automatically inserting an angle plate into a duct flange including at least one clamping member for clamping the duct into position on the platen, a feed member for feeding an angle plate into place in the duct flange, at least one press member for pressing an angle plate into the duct flange, and a supply hopper having a plurality of angle plates for supplying angle plates to the feed member (c) said apparatus further including a seam closing assembly for automatically closing a seam of a duct comprising a pair of vertical support members constructed and arranged outside of the work area of the assembly for automatically inserting an angle plate, a seam closing carriage connected to the vertical support members and having a horizontal member with a housing having a seam forming member, and means for moving the seam closing carriage up and down the vertical support members;

(d) clamping said duct into said apparatus; and (e) closing the seam of said duct, wherein said carriage assembly moves vertically on said vertical support members and wherein said seam forming member closes the seam of said duct.

* * * * *

UNITED STATES PATENT AND TRADEMARK OFFICE
CERTIFICATE OF CORRECTION

| | | |
|---|---|---|
| PATENT NO. | : 9,157,653 B2 | |
| APPLICATION NO. | : 14/678569 | |
| DATED | : October 13, 2015 | |
| INVENTOR(S) | : David E. Daw, Cody B. Umberger and Michael C. Borwig | |

It is certified that error appears in the above-identified patent and that said Letters Patent is hereby corrected as shown below:

IN THE CLAIMS:

Column 11, Claim 4, line 3, "unreamed" should read -- unseamed --.

Signed and Sealed this
Tenth Day of May, 2016

Michelle K. Lee
*Director of the United States Patent and Trademark Office*